US 8,878,481 B2

(12) United States Patent
Connelly et al.

(10) Patent No.: US 8,878,481 B2
(45) Date of Patent: Nov. 4, 2014

(54) METHOD AND APPARATUS FOR LIMITING IN-RUSH CURRENT TO A STARTER MOTOR OF A VEHICLE

(75) Inventors: Chris Connelly, Essex (GB); Mark Conen, Newmarket (GB)

(73) Assignee: Ford Global Technologies, LLC, Dearborn, MI (US)

( * ) Notice: Subject to any disclaimer, the term of this patent is extended or adjusted under 35 U.S.C. 154(b) by 572 days.

(21) Appl. No.: 13/252,675

(22) Filed: Oct. 4, 2011

(65) Prior Publication Data

US 2012/0119516 A1    May 17, 2012

(30) Foreign Application Priority Data

Nov. 11, 2010 (GB) .................................... 1019079.1

(51) Int. Cl.
*H02P 1/16* (2006.01)
*F02N 11/08* (2006.01)
(52) U.S. Cl.
CPC ............. *F02N 11/0814* (2013.01); *Y02T 10/48* (2013.01); *F02N 2200/0801* (2013.01); *F02N 2250/02* (2013.01); *F02N 11/087* (2013.01)
USPC ............................ 318/778; 318/798; 318/799
(58) Field of Classification Search
USPC ............ 318/778, 779, 730; 290/9, 18, 19, 22, 290/28, 48, 38 R, 38 E; 180/53.1, 53.5, 422, 180/423, 65.1
See application file for complete search history.

(56) References Cited

U.S. PATENT DOCUMENTS

| | | | |
|---|---|---|---|
| 4,078,631 A * | 3/1978 | Kadota et al. ................. | 180/179 |
| 4,114,076 A * | 9/1978 | Teranishi et al. ............. | 388/849 |
| 4,544,870 A * | 10/1985 | Kearns et al. ................. | 318/444 |
| 4,564,906 A * | 1/1986 | Stephan et al. ................ | 701/65 |
| 6,834,632 B2 * | 12/2004 | Kataoka et al. ............ | 123/179.4 |
| 6,934,141 B2 | 8/2005 | Hamano et al. | |
| 7,077,092 B2 | 7/2006 | Senda et al. | |
| 8,326,502 B2 * | 12/2012 | Snyder ........................... | 701/55 |
| 2007/0205031 A1 | 9/2007 | Ogata | |

FOREIGN PATENT DOCUMENTS

| | | |
|---|---|---|
| JP | 58141687 A | 8/1983 |
| JP | 64-047287 A | 2/1989 |
| JP | 10243555 A | 9/1998 |
| JP | 2006352965 A | 12/2006 |
| JP | 2009068426 A | 4/2009 |
| JP | 2010236553 A | 10/2010 |

OTHER PUBLICATIONS

"Capacitor switching contactor cuts current inrush," SOURCE the Engineer, Rockwell Automation, Allen-Bradley 100Q Capacitor Switching Contactor, <http://source.theengineer.co.uk/plant-equipment/electrical-supplies/cables/capacitor-switching-contactor-cuts-current-inrush/108287.article>, Jun. 27, 2001, 3 pages.

ISA Great Britain Intellectual Property Office, Search Report of GB1019079.1, Mar. 8, 2011, South Wales, 4 pages.

* cited by examiner

*Primary Examiner* — Bentsu Ro
*Assistant Examiner* — Thai Dinh
(74) *Attorney, Agent, or Firm* — Julia Voutyras; Alleman Hall McCoy Russell & Tuttle LLP

(57) ABSTRACT

A system and method for limiting engine starting current of a starter motor of an engine is described. In one example, starter motor current is controlled according to vehicle speed. The method may allow vehicle system voltage to remain at a higher level during automatically initiated engine starts.

20 Claims, 4 Drawing Sheets

METHOD AND APPARATUS FOR LIMITING IN-RUSH CURRENT TO A STARTER MOTOR OF A VEHICLE

RELATED APPLICATIONS

This application claims priority to United Kingdom Patent Application No. 1019079.1, filed Nov. 11, 2010, entitled "A Method and Apparatus for Limiting the In-Rush Current to a Starter Motor of a Motor Vehicle," the entire contents of which are herein incorporated by reference for all purposes.

FIELD

The present description relates to motor vehicles and in particular to a motor vehicle having an engine and an automatic stop-start system for the engine.

BACKGROUND AND SUMMARY

It may be desirable to control the in-rush current to a starter motor for an engine of a motor vehicle by providing a resistance arranged in series with the starter motor. For a conventional or 'static' stop-start system, the vehicle is stationary when the engine is stopped and started and so a significant voltage drop due to a relatively high in-rush current is permissible since a relatively high amount of torque may be used to start the vehicle. It is desirable to permit a relatively high in-rush current to occur as this will result in rapid starting of the engine which is required for a normal 'static' automatic start operation of the motor vehicle.

However, if the motor vehicle is operated in an automatic stop-start mode when the vehicle is moving in a so called 'dynamic' stop-start mode then the relatively high in-rush current normally used for a 'static' start may result in an undesirable voltage drop. This is because some vehicle systems such as anti-lock braking systems and electronically controlled steering can be degraded when the system voltage drops below a predetermined level.

It may therefore be desirable to use a high level of in-rush current resistance when conducting a 'dynamic' automatic restart as the time taken to restart the engine is less critical and the need to prevent undesirable system voltage drop is paramount in order to maintain operation of other vehicle systems. However, if a lower level of in-rush current is continuously set so as to prevent an undesirable voltage drop for 'dynamic' automatic restarts, then the start-up performance of the motor vehicle may be slower than is desired for 'static' automatic restarts.

It is an object of the description to provide a method and apparatus for providing acceptable restart performance while maintaining operation of other vehicle systems.

The inventors herein have recognized the above-mentioned disadvantages and have developed an a method of limiting the in-rush current to a starter motor of an engine of a vehicle comprising: providing at least two levels of in-rush current restriction and applying one of the at least two levels of in-rush current restriction to the starter motor in response to the present operating speed of the vehicle.

By applying different levels of in-rush current to a starter motor that engages an engine during engine starting, it may be possible to provide a vehicle system voltage that allows for continued operation of other vehicle electrical power consumers during engine cranking. For example, in-rush current supplied to a starter motor during engine cranking can be reduced when a vehicle speed is above a threshold level to allow electrically assisted brakes to operate. In this way, operation of vehicle electrical power consumers can continue even during engine cranking.

The present description may provide several advantages. Specifically, the approach may allow additional vehicle electrical consumers to operate during engine cranking. Further, the approach can provide different levels of in-rush current for different vehicle speeds so that when the engine is started via a starter and vehicle kinetic energy (e.g., rotating the engine via vehicle wheel torque) a desirable level of starter current is provided. Further still, the approach provides for a higher level of starter current during cold engine starting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

The drawings included herein serve merely for the explanation of the description, and do not restrict the description.

DETAILED DESCRIPTION

Figure 1:
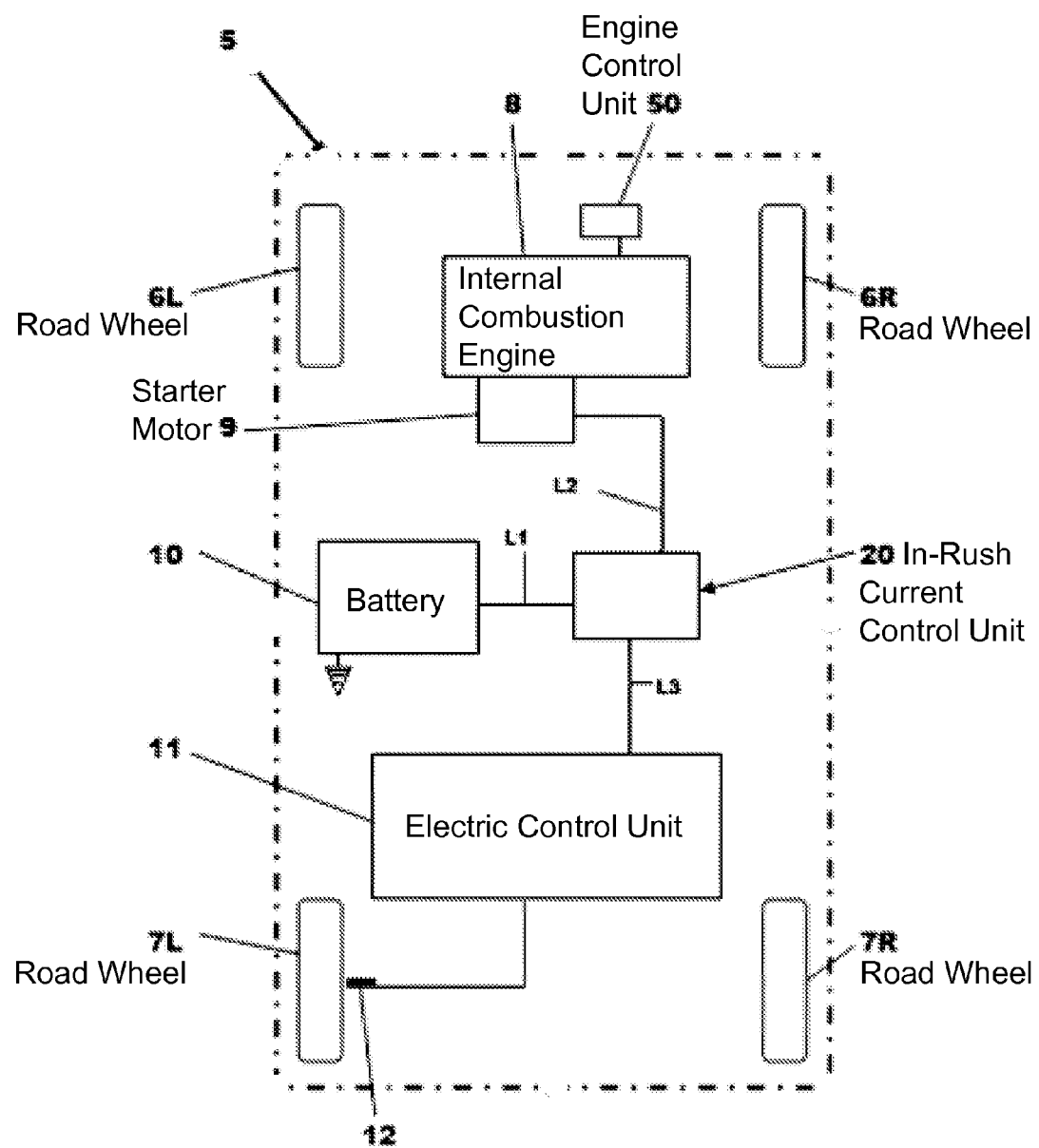
FIG. 1 is a block diagram view of a motor vehicle having an apparatus for limiting the in-rush current to a starter motor according to one aspect of the description.
Figure 2:
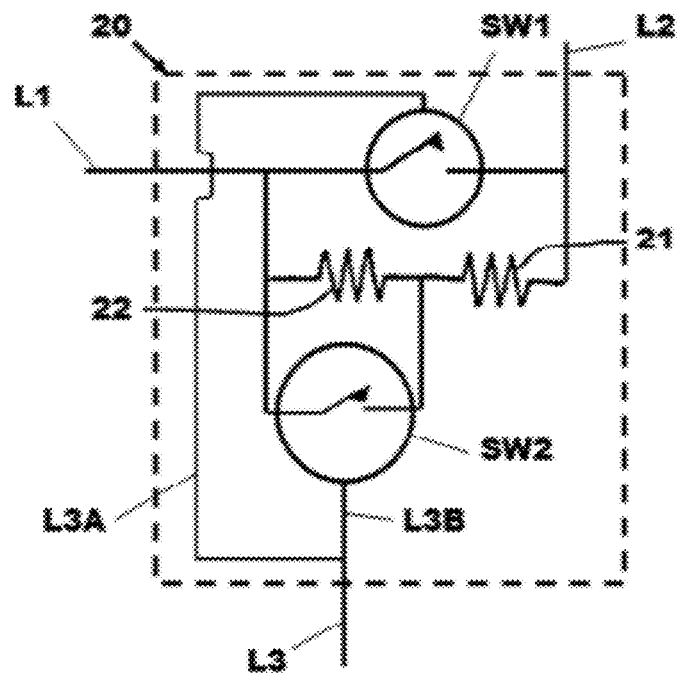
FIG. 2 is a diagram of one embodiment of an in-rush current control unit according to the description.
Figure 3:
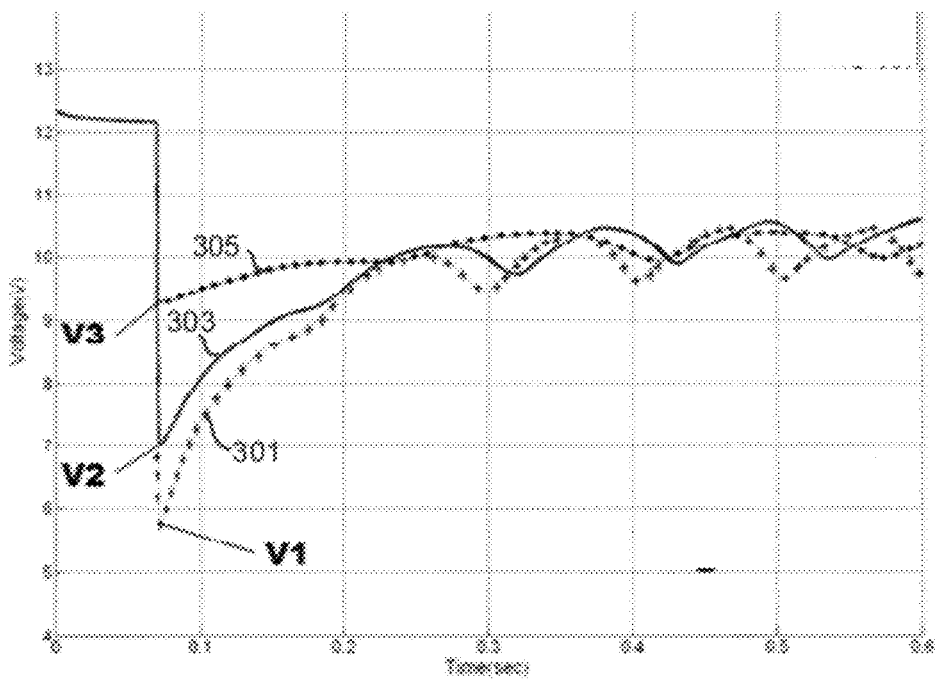
FIG. 3 is a chart of system voltage versus time showing the effect of three modes of operation of the in-rush current control unit shown in FIG. 2 during an engine start event.
Figure 4:
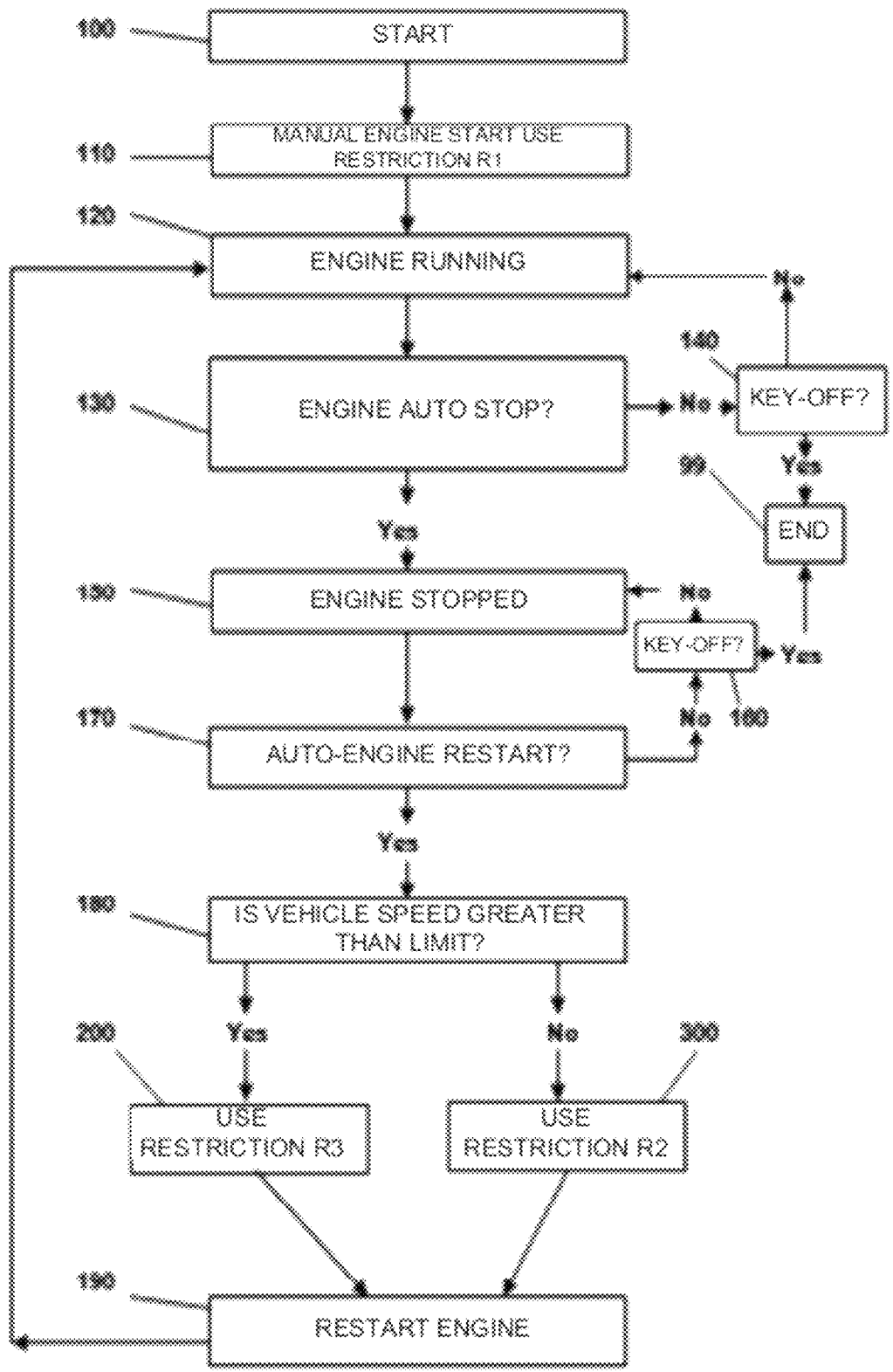
FIG. 4 is a flowchart showing a method of limiting in-rush current to a starter motor according to one aspect of the description.
Figure 5:
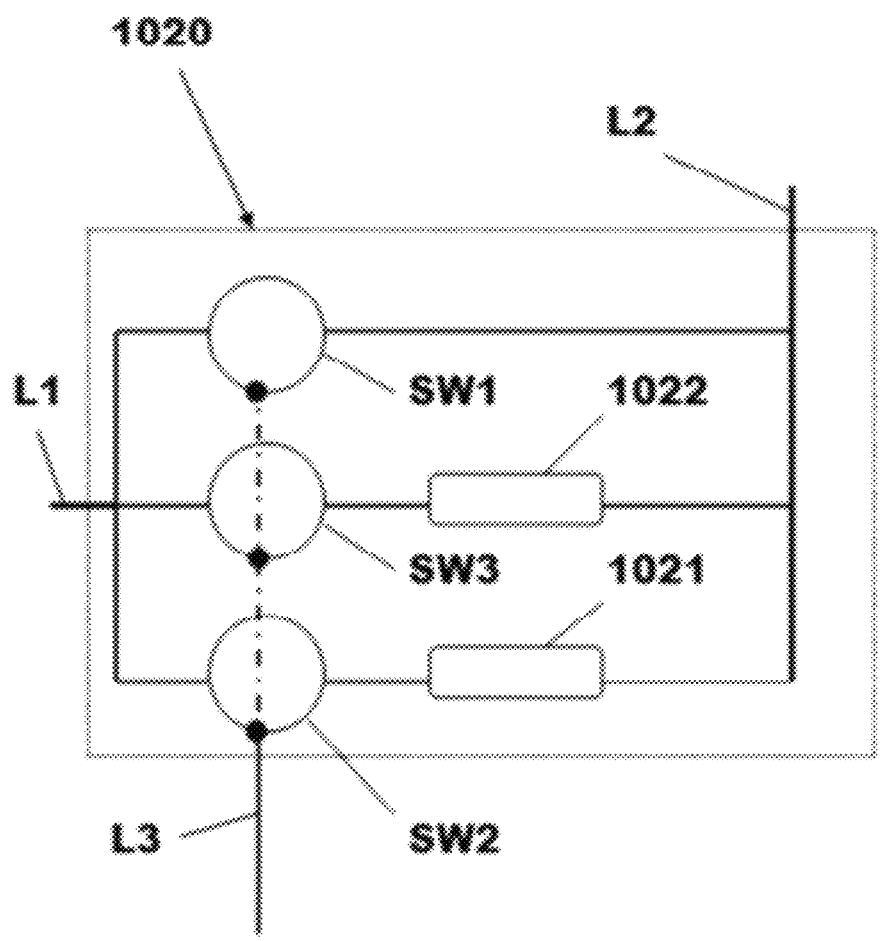
FIG. 5 is a view similar to FIG. 2 but showing a second embodiment of an in-rush control unit according to the description.

The present description is related to starting an engine of a stop/start vehicle. In one example, the system applies to a vehicle as shown in FIG. 1. The system may be implemented with current in-rush circuits as shown in FIGS. 2 and 5. The system can vary vehicle system voltage as illustrated in FIG. 3. The system may include a method executable via instructions of a controller as shown in FIG. 4.

According to a first aspect of the description there is provided a method of limiting the in-rush current to a starter motor of an engine of a motor vehicle comprising providing at least two levels of in-rush current restriction and applying a level of in-rush current restriction to the starter motor based upon the current operating speed of the motor vehicle. There may be a first level of in-rush current restriction and a second level of in-rush current restriction that is higher than the first level of in-rush current restriction. In one example, the first level of in-rush current restriction may be used when the current speed of the motor vehicle is below a predetermined speed limit and the second level of in-rush current restriction may be used when the current speed of the motor vehicle is above the predetermined speed limit.

The engine of the motor vehicle may also include an automatic stop-start control system and the first and second levels of in-rush current restriction may be applied to the starter motor when the engine is automatically started by the automatic stop-start control system. In some examples, there may be a third level of in-flow current restriction that is lower (e.g., lower resistance) than the first level of in-rush current restriction, and the third level of in-rush current restriction may be used when the engine is manually started by a user of the motor vehicle.

According to a second aspect of the description there is provided an apparatus for controlling the in-flow current to a battery powered starter motor of an engine of a motor vehicle, the apparatus comprising an in-rush current control unit interposed between the battery and the starter motor arranged to impose at least two levels of in-flow current restriction to the starter motor when the starter motor is energized to start the engine wherein the level of in-rush current restriction applied to the starter motor by the in-rush current control unit is based upon the current speed of the motor vehicle. Each level of in-rush current restriction may be provided by a resistance connected in series with the starter motor. The in-rush control unit may be controlled by an electronic controller based upon a signal indicative of current vehicle speed received by the electronic controller. In some examples, there may be a first level of in-rush current restriction and a second level of in-rush current restriction that is higher (e.g., higher resistance) than the first level of restriction. The first level of in-rush current restriction may be used when the current speed of the motor vehicle is below a predetermined speed limit and the second level of in-rush current restriction may be used when the current speed of the motor vehicle is above the predetermined speed limit.

The engine of the motor vehicle may also include an automatic stop-start control system and the first and second levels of in-rush current restriction may be used when the engine is automatically started by the automatic stop-start control system. The motor vehicle may further include a manually operable starter switch, and there may be a third level of in-flow current restriction that is lower than the first level of in-rush current restriction, wherein the third level of in-rush current restriction may be used when the engine is started by a user of the motor vehicle using the manually operable starter switch. The first level of in-rush current restriction may be provided by a first resistor arranged in series with the starter motor and the second level of in-rush flow restriction is provided by the first resistor and a second resistor arranged in series with the first resistor. A switchable bypass link may be provided around the second resistor controlled by the electronic control unit, the electronic control unit being operable to switch in the bypass link when the first level of resistance is required and switch out the bypass link when the second level of resistance is required.

According to a third aspect of the description there is provided a motor vehicle having an apparatus for controlling the in-flow current to a battery powered starter motor of an engine of the motor vehicle constructed in accordance with said second aspect of the description.

Referring now to FIG. 1, there is shown a motor vehicle 5 having four road wheels 6L, 6R, 7L and 7R and an internal combustion engine 8 to provide a motive effort for the motor vehicle 5. The engine 8 is started when required by energizing an electric starter motor 9. The starter motor 9 is powered by an electric energy storage device which in this case is in the form of a battery 10.

Operation of the engine 8 is controlled by an engine control unit 50 that includes logic providing automatic stop-start control of the engine 8. The engine control unit 50 therefore forms in part an electronic stop-start control system for the engine 8.

The flow of current from the battery 10 to the starter motor 9 is controlled by an in-rush current control unit 20 in response to commands from an electronic control unit 11. The battery 10 is connected to the in-rush current control unit 20 by a power cable L1 and the in-rush control unit 20 is connected to the starter motor 9 by a second power cable L2. A control link L3 provides communication between the electronic control unit 11 and the in-rush current control unit 20.

The electronic control unit 11 receives a signal or data indicative of the current speed of the motor vehicle 5 from a wheel speed sensor 12 associated with the road wheel 7L. However, it will appreciated that the description is not limited to the use of a road wheel sensor and that any means of providing an indication of current road speed could be used such as, for example and without limitation, data from a GPS (global positioning system) such as a navigation system or from an engine speed sensor and gear ratio sensor.

The electronic control unit 11 uses the speed information it receives from the wheel speed sensor 12 to determine whether the current vehicle speed is above or below a predetermined speed limit. The speed limit is a low vehicle speed such as, for example, a value in the range of 0 to 15 Kph such as 5 Kph.

If the current vehicle speed is below the predetermined speed limit then the electronic control unit 11 controls the in-rush current control unit 20 to provide a first level of resistance when the starter motor 9 is operated by the stop-start control system to start the engine 8, and if the current vehicle speed is greater than the predetermined speed limit, the electronic control unit 11 controls the in-rush current control unit 20 to provide a second, higher level of resistance when the starter motor 9 is operated by the stop-start control system to start the engine 8.

Operation of the apparatus will now be further described with additional reference to FIGS. 2 and 3.

In one example, the in-rush control unit 20 comprises of two resistances 21 and 22 arranged in series and connected between the battery 10 and the starter motor 9 by the power cables L1 and L2. First and second switches SW1 and SW2 are also provided to select various levels of in-rush current resistance.

The first switch SW1 which can be a solenoid operated switch, a relay or a solid state switch and is a normally open switch. When the first switch SW1 is closed it provides a direct connection between the power cable L1 and the power cable L2. The state of the first switch SW1 is in this condition controlled by the electronic control unit 11 but could alternatively be a manually controlled ignition switch (not shown). Such an arrangement provides a very low level of resistance to in-rush current and, as can be seen in FIG. 3, this results in an increased drop in system voltage from approximately 12.4 volts to a value of V1 which is approximately 5.8 volts. However, such an arrangement provides maximum starting power which is advantageous when starting the engine 8 from cold conditions. The curve 301 represents the relationship between voltage and time when the first switch SW1 is closed during starter engagement and engine cranking.

The second switch SW2 controls the flow of current through a switchable bypass link around the second resistor 22 and is normally open so as to provide a desirable operating state. The second switch SW2 can be in the form of a relay, solenoid operated switch or solid state switch and is controlled by the electronic control unit 11 based upon the current speed of the motor vehicle 5.

In one example the first resistor 21 has a resistance of 2 mille Ohms and the second resistor 22 has a resistance of 10 mille Ohms but it will be appreciated other values may be used.

When the first switch SW1 is open and the second switch SW2 is closed, the bypass link is engaged and the resistance between the power cable L1 and the power cable L2 is equal to the resistance of the first resistor 21 namely 2 mille ohms. This constitutes a first level of resistance optimized to provide good starting performance while providing some in-rush current restriction.

Such an arrangement provides a moderate level of resistance to in-rush current and, as can be seen in FIG. 3, this results in a drop in system voltage from approximately 12.4 volts to a value of V2 which is approximately 7.0 volts. The curve 303 represents the relationship between voltage and time when the first switch SW1 is open and the second switch SW2 is closed during starter engagement and engine cranking.

When the first switch SW1 is open and the second switch SW2 is open, the bypass link is disengaged and the resistance between the power cable L1 and the power cable L2 is equal to the combined resistance of the first resistor 21 and the second resistor 22, namely 12 mille ohms. This constitutes a second level of resistance that is higher than the first level of resistance, and the resistance level is optimized to provide minimal voltage drop while retaining reliable starting performance.

Such an arrangement provides a high level of resistance to in-rush current and, as can be seen in FIG. 3, this results in a drop in system voltage from approximately 12.4 volts to a value of V3 which is approximately 9.3 volts. The curve 305 represents the relationship between voltage and time when the first switch SW1 is open and the second switch SW2 is open.

Operation is as follows, when the engine 8 is manually started by an operator of the motor vehicle 5 by pushing a button (not shown) of a key-less ignition system. Signals are sent to the engine control unit 50 and to the electronic controller 11 to start the engine 8. The electronic controller 11 then sends a signal to the in-rush control unit 20 causing the first switch SW1 to close, this provides the minimum resistance to in-rush current and hence the maximum starting performance of the starter. The position of the second switch SW2 is not important in this mode of operation. If the motor vehicle 5 is fitted with a conventional key-operated ignition switch, then this may directly operate the first switch SW1 and the electronic control unit 11 is not then used.

When the motor vehicle 5 has been stopped by the stop-start system and the conditions are such that an automatic engine restart is required, then the electronic control unit 11 determines from the wheel speed sensor 12 whether the current vehicle speed is less than the predetermined speed limit, which in this example is 5 Kph.

If the current vehicle speed is less than 5 Kph, then the electronic control unit leaves the first switch SW1 open and closes the second switch SW2 so that the first resistance 21 is placed in series with the starter motor 9. On the other hand, if the current vehicle speed is equal to or greater than 5 Kph, then the electronic control unit 11 leaves the first switch SW1 open and opens the second switch SW2 so that the first resistance 21 and the second resistance 22 are both placed in series with the starter motor 9.

Therefore two levels of in-rush current resistance are provided based upon the speed of the vehicle.

FIG. 5 shows a second example of an in-rush control unit 1020 which is intended to be a direct replacement for the in-rush control unit 20 described above. The difference between this second example and the first example is that in the case of the first example two resistors are used in series to provide two levels of resistance whereas in the case of the second example separate independently switched resistors are used to provide the two levels of resistance.

The in-rush control unit 1020 comprises of a first switch SW1 used as before to provide a selective direct link between the power cable L1 and the power cable L2 and two resistances 1021 and 1022 arranged in parallel and connectable individually in series between the battery 10 and the starter motor 9 by the power cables L1 and L2 and second and third switches SW2 and SW3 respectively.

The first resistor 1021 has in one example a resistance of 2 mille ohms and the second resistor 1022 has a resistance of 12 mille ohms. It will however be appreciated that other values could be used and that the description is not limited to the use of resistors having these values.

The first switch SW1 can be a solenoid operated switch, a relay or a solid state switch and is, as before, a normally open switch. Similar to the example of FIG. 2, the state of the first switch SW1 is in this case controlled by the electronic control unit 11 but could alternatively be a manually controlled ignition switch (not shown). Such an arrangement provides, as before, a very low level of resistance to in-rush current and would produce a voltage to time relationship similar to the curve 301 of FIG. 3.

The second switch SW2 controls the flow of current through the first resistor 1021. The second switch SW2 can be in the form of a relay, solenoid operated switch or solid state switch and is controlled by the electronic control unit 11 based upon the current speed of the motor vehicle 5.

The third switch SW3 controls the flow of current through the second resistor 1022. The third switch SW3 can be in the form of a relay, solenoid operated switch or solid state switch and is controlled by the electronic control unit 11 based upon the current speed of the motor vehicle 5.

In this example the second resistor 1022 has a resistance six times higher than the resistance of the first resistor 1021 as it operates independently of the first resistor 1021.

When the first and third switches SW1 and SW3 are open and the second switch SW2 is closed, the resistance between the power cable L1 and the power cable L2 is equal to the resistance of the first resistor 1021. This constitutes a first level of resistance optimized to provide good starting performance while providing some in-rush current restriction.

Such an arrangement provides a moderate level of resistance to in-rush current and would produce a voltage to time relationship similar to the curve 303 on FIG. 3.

When the first and second switches SW1 and SW2 are open and the third switch SW3 is closed, the resistance between the power cable L1 and the power cable L2 is equal to the resistance of the second resistor 1022. This constitutes a second level of resistance that is higher than the first level of resistance and is optimized to provide minimal voltage drop while retaining reliable starting performance. Such an arrangement provides a high level of resistance to in-rush current and would produce a voltage to time relationship similar to the curve 305 on FIG. 3.

Operation is as follows, when the engine 8 is manually started by an operator of the motor vehicle 5 by pushing a button (not shown) of a key-less ignition system, signals are sent to the engine control unit 50 and to the electronic controller 11 to start the engine 8. The electronic controller 11 then sends a signal to the in-rush control unit 1020 causing the first switch SW1 to close, this provides the minimum resistance to in-rush current and hence the maximum starting performance. The position of the second and third switches SW2 and SW3 are both open as they are both normally open switches. If the motor vehicle 5 is fitted with a conventional key-operated ignition switch then this may directly operate the first switch SW1 and the electronic control unit 11 is not then used.

When the motor vehicle 5 has been stopped by the stop-start system and the conditions are such that an automatic engine restart is required then the electronic control unit 11 determines from the wheel speed sensor 12 whether the current vehicle speed is less than the predetermined speed limit, which in this case is 5 Kph.

If the current vehicle speed is less than 5 Kph then the electronic control unit 11 leaves the first and third switches SW1 and SW3 open and closes the second switch SW2 so that only the first resistance 1021 is placed in series with the starter motor 9 and, if the current vehicle speed is equal to or greater than 5 Kph then the electronic control unit 11 leaves the first and second switches SW1 and SW2 open and closes the third switch SW3 so that the second resistance 1022 is placed in series with the starter motor 9.

Therefore once again two levels of in-rush current resistance are provided based upon the speed of the vehicle.

The systems described in FIGS. 1, 3, and 5 provide for a system for controlling starter motor current for an engine, comprising: an in-rush current control unit interposed between a battery and a starter motor, the in-rush current control unit arranged to supply at least two levels of in-rush current restriction to the starter motor when the starter motor is energized; and a controller including instructions to select between the at least two levels of in-rush current restriction in response to a present vehicle speed. The system includes where each level of at least two levels of in-rush current restriction is provided by a resistance connected in series with the starter motor.

In some examples, the system includes where the in-rush control unit is controlled by the c controller based upon a signal indicative of present vehicle speed received from a wheel speed sensor via the controller. The system also includes where a first level of in-rush current restriction and a second level of in-rush current restriction are provided, and where the second level of in-rush current restriction is greater than the first level of in-rush current restriction. The system further includes where the first level of in-rush current restriction is applied when the present vehicle speed is below a predetermined speed limit and the second level of in-rush current restriction is applied when the present vehicle speed of the vehicle is above the predetermined speed limit.

The system also applies to stop/stop vehicle. For example, the system includes where the engine of the vehicle includes an automatic stop-start control system and where the first and second levels of in-rush current restriction are applied to the starter motor when the engine is automatically started via the automatic stop-start control system. The system further comprises where the vehicle includes a manually operable starter switch and a third level of in-flow current restriction that is lower than the first level of in-rush current restriction, and where the third level of in-rush current restriction is applied to the starter motor when the engine is started via a user of the vehicle via the manually operable starter switch. The system also includes where the first level of in-rush current restriction is provided via a first resistor arranged in series with the starter motor, and where the second level of in-rush flow restriction is provided via the first resistor and a second resistor arranged in series with the first resistor.

The system may also be provided in a variety of configurations. For example, the system includes where a switchable bypass link is provided around the second resistor and is controlled via the controller, the controller unit being operable to change state of the switchable bypass link when the first level of resistance is desired and change state of the switchable bypass link when the second level of resistance is desired. The system also includes where the controller includes further instructions for selecting a level of in-rush current restriction before the starter motor is engaged.

Referring now to FIG. 4, a high level flow chart showing a method according to this description is shown. The method of FIG. 4 may be executed via instructions executed by electronic control unit 11 of FIG. 1.

The method starts at 100 corresponding to a key-on command, and then at 110, a manual engine start is performed using a low resistance to in-rush current as shown by the curve 301 on FIG. 3.

The method then advances to 120 where the engine 8 is running and then onto step 130 where it is determined whether an automatic engine stop has been requested by the stop-start control system. If the answer is 'No' then the method advances to 140 where it is determined whether a key-off event has occurred. If a key-off event has not occurred, the method returns to 120, but if it has, the method terminates at step 99.

If however at 130 an automatic engine stop request has been received from the stop-start control system, then the engine 8 is stopped as indicated in 150. The method then advances to 170 where it checks whether an automatic engine restart command has been received from the stop-start control system. If no such restart command is received, the engine 8 will remain in the stopped state unless a key-off command is received in step 160. If a key-off command is received then the method will terminate at step 99.

If at 170 a command for an engine restart is received, then the method advances to 180 and it is determined whether the vehicle speed is above or below a predetermined speed limit. It will be appreciated that this operation will also include the sub-operations of determining the current vehicle speed and comparing the determined speed with the predetermined speed limit.

If the current vehicle speed is below the predetermined speed limit, then the method advances to 300 where a moderate first level of in-rush current resistance is applied to the input of the starter before the starter is engaged or power is applied to the starter having a result as indicated by the curve 303 on FIG. 3.

Alternatively, if the current vehicle speed is above the predetermined speed limit then the method advances to 200 where a second level of in-rush current resistance is applied to the input of the starter before the starter is engaged or power is applied to the starter, the resistance being higher than the first level of in-rush current resistance and which has a result indicated by the curve 305 on FIG. 3.

Therefore depending upon the speed of the vehicle differing levels of in-rush current are used with a higher level of resistance being used if the vehicle is moving than if the vehicle is stationary or almost stationary.

Although the description has been described with reference to embodiments that use switched resistances of differing values to produce two distinct levels of in-rush current resistance, it will be appreciated that several distinct levels of resistance could be used selected based upon the speed of the motor vehicle. In such a case there may be several predetermined speed levels. Similarly, a variable resistance could be used and the resistance could be increased as the vehicle speed increases between lower and upper limits so as to provide many levels of resistance. In this condition a predetermined current vehicle speed would not be used therebeing instead a predetermined relationship between in-rush current resistance and vehicle speed that would be applied by the electronic control unit 11 to the variable resistance.

Although the electronic control unit is shown as a separate unit it will be appreciated that it could form part of another controller such as the engine control unit 50.

Thus, the method of FIG. 4 provides for a method of limiting in-rush current to an engine starter motor of a vehicle, comprising: during a first vehicle speed, applying a first level of in-rush current restriction to the engine starter motor; and during a second vehicle speed, applying a second level of in-rush current restriction to the engine start motor. The method also includes where the second level of in-rush current restriction is a greater resistance than the first level of in-rush current restriction. The method includes where the first level of in-rush current restriction is applied to the engine starter motor when the present operating speed of the vehicle is below a predetermined speed limit, and the second level of in-rush current restriction is applied to the engine starter motor when the present operating speed of the vehicle is above the predetermined speed limit.

In some example, the method includes where an engine of the vehicle includes an automatic stop-start control system, and the first and second levels of in-rush current restriction are applied to the engine starter motor when the engine is automatically started by the automatic stop-start control system. The method also includes where a third level of in-flow current restriction to the engine starter motor is provided, and where the third level of in-flow current restriction resistance is lower than the first level of in-rush current restriction, and where the third level of in-rush current restriction is applied to the engine starter motor when the engine is manually started via a operator of the vehicle. The method also includes where the two levels of in-rush current restriction are automatically switched in and out of a circuit supplying current to the engine starter motor via a controller.

The method of FIG. 4 also provides for applying a first level of resistance to an input of the engine starter motor in response to a vehicle speed when the vehicle speed is greater than a threshold vehicle speed before engaging the engine starter motor to an engine; applying a second level of resistance to the input of the engine starter motor in response to the vehicle speed when the vehicle speed is less than the threshold vehicle speed before engaging the engine starter motor to the engine; and disengaging the engine starter motor after the engine is started. The method also includes where the first and second levels of resistance are adjusted via a controller before a request to start the engine is present. The method further comprises applying a third level of resistance to the input of the engine starter motor during manual engagement of the engine starter motor via an operator of the vehicle. The method also further comprises where the resistance is increased as vehicle speed increases.

As will be appreciated by one of ordinary skill in the art, routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method of limiting in-rush current to an engine starter motor of a vehicle, comprising:
   during a first vehicle speed, applying a first level of in-rush current restriction to the engine starter motor; and
   during a second vehicle speed, applying a second level of in-rush current restriction to the engine starter motor.

2. The method of claim 1, where the second level of in-rush current restriction is a greater resistance than the first level of in-rush current restriction.

3. The method of claim 2, where the first level of in-rush current restriction is applied to the engine starter motor when a present operating speed of the vehicle is below a predetermined speed limit, and the second level of in-rush current restriction is applied to the engine starter motor when the present operating speed of the vehicle is above the predetermined speed limit.

4. The method of claim 3, where an engine of the vehicle includes an automatic stop-start control system, and the first and second levels of in-rush current restriction are applied to the engine starter motor when the engine is automatically started by the automatic stop-start control system.

5. The method of claim 4, where a third level of in-flow current restriction to the engine starter motor is provided, and where the third level of in-flow current restriction resistance is lower than the first level of in-rush current restriction, and where the third level of in-rush current restriction is applied to the engine starter motor when the engine is manually started via an operator of the vehicle.

6. The method of claim 1, where the first and second levels of in-rush current restriction are automatically switched in and out of a circuit supplying current to the engine starter motor via a controller.

7. A system for controlling starter motor current for an engine, comprising:
   an in-rush current control unit interposed between a battery and a starter motor, the in-rush current control unit arranged to supply at least two levels of in-rush current restriction to the starter motor when the starter motor is energized; and
   a controller including instructions to select between the at least two levels of in-rush current restriction in response to a present vehicle speed.

8. The system of claim 7, where each level of at least two levels of in-rush current restriction is provided by a resistance connected in series with the starter motor.

9. The system of claim 8, where the in-rush current control unit is controlled via the controller based upon a signal indicative of present vehicle speed received from a wheel speed sensor via the controller.

10. The system of claim 8, where a first level of in-rush current restriction and a second level of in-rush current restriction are provided, and where the second level of in-rush current restriction is greater than the first level of in-rush current restriction.

11. The system of claim 10, where the first level of in-rush current restriction is applied when the present vehicle speed is below a predetermined speed limit and the second level of in-rush current restriction is applied when the present vehicle speed of the vehicle is above the predetermined speed limit.

12. The system of claim 11, where the engine of the vehicle includes an automatic stop-start control system and where the first and second levels of in-rush current restriction are applied to the starter motor when the engine is automatically started via the automatic stop-start control system.

13. The system of claim 12, further comprising where the vehicle includes a manually operable starter switch and a third level of in-flow current restriction that is lower than the first level of in-rush current restriction, and where the third level of in-rush current restriction is applied to the starter motor when the engine is started via a user of the vehicle via the manually operable starter switch.

14. The system of claim 12, where the first level of in-rush current restriction is provided via a first resistor arranged in series with the starter motor, and where the second level of in-rush flow restriction is provided via the first resistor and a second resistor arranged in series with the first resistor.

15. The system of claim 14, where a switchable bypass link is provided around the second resistor and is controlled via the controller, the controller being operable to change a state of the switchable bypass link when the first level of resistance is desired and change the state of the switchable bypass link when the second level of resistance is desired.

16. The system of claim 7, where the controller includes further instructions for selecting a level of in-rush current restriction before the starter motor is engaged.

17. A method of limiting in-rush current to an engine starter motor of a vehicle comprising:
   applying a first level of resistance to an input of the engine starter motor in response to a vehicle speed when the vehicle speed is greater than a threshold vehicle speed before engaging the engine starter motor to an engine;
   applying a second level of resistance to the input of the engine starter motor in response to the vehicle speed when the vehicle speed is less than the threshold vehicle speed before engaging the engine starter motor to the engine; and
   disengaging the engine starter motor after the engine is started.

18. The method of claim 17, where the first and second levels of resistance are adjusted via a controller before a request to start the engine is present.

19. The method of claim 18, further comprising applying a third level of resistance to the input of the engine starter motor during manual engagement of the engine starter motor via an operator of the vehicle.

20. The method of claim 18, further comprising where input resistance of the engine starter motor is increased as vehicle speed increases.

* * * * *